US012245356B2

(12) United States Patent
Doherty et al.

(10) Patent No.: US 12,245,356 B2

(45) Date of Patent: Mar. 4, 2025

(54) RADIOTHERAPY DEVICE

(71) Applicant: Elekta Limited, Crawley (GB)

(72) Inventors: Peter Doherty, Crawley (GB); Emma Wooldridge, Crawley (GB); Ian Shinton, Crawley (GB)

(73) Assignee: Elekta Limited, Crawley (GB)

( * ) Notice: Subject to any disclaimer, the term of this patent is extended or adjusted under 35 U.S.C. 154(b) by 91 days.

(21) Appl. No.: 17/757,680

(22) PCT Filed: Dec. 18, 2020

(86) PCT No.: PCT/EP2020/087154

§ 371 (c)(1),
(2) Date: Jun. 17, 2022

(87) PCT Pub. No.: WO2021/123256

PCT Pub. Date: Jun. 24, 2021

(65) Prior Publication Data

US 2023/0019382 A1 Jan. 19, 2023

(30) Foreign Application Priority Data

Dec. 19, 2019 (GB) ..................................... 1918793

(51) Int. Cl.
*H05H 7/08* (2006.01)
*H05H 7/04* (2006.01)
(Continued)

(52) U.S. Cl.
CPC ................ *H05H 7/08* (2013.01); *H05H 7/04* (2013.01); *H05H 7/12* (2013.01); *H05H 9/048* (2013.01);
(Continued)

(58) Field of Classification Search
None
See application file for complete search history.

(56) References Cited

U.S. PATENT DOCUMENTS 3,959,687 A * 5/1976 Schriber .................. H05H 9/04 315/501
9,031,200 B2 * 5/2015 Ho ........................... H05H 9/04 378/65
(Continued)

FOREIGN PATENT DOCUMENTS

CN 106535457 A 3/2017
CN 206237662 U 6/2017
(Continued)

OTHER PUBLICATIONS

"European Application Serial No. 1918793.9, European Search Report dated Jun. 11, 2020", (Jun. 11, 2020), 7 pgs.
(Continued)

*Primary Examiner* — Srinivas Sathiraju
(74) *Attorney, Agent, or Firm* — Schwegman Lundberg & Woessner, P.A.

(57) ABSTRACT

A particle accelerator comprising a waveguide comprising a series of acceleration cells. The series of acceleration cells comprise an input acceleration cell configured to accelerate a beam of electrons along the central axis of the cells. A source of electrons is configured to input a beam of electrons into the input acceleration cell and a magnet arrangement is configured to prevent electrons that have deviated from the beam of electrons from hitting the source of electrons.

19 Claims, 9 Drawing Sheets

(51) Int. Cl.
*H05H 7/12* (2006.01)
*H05H 9/04* (2006.01)

(52) U.S. Cl.
CPC . *H05H 2007/043* (2013.01); *H05H 2007/084* (2013.01); *H05H 2007/122* (2013.01); *H05H 2277/113* (2013.01)

(56) References Cited

U.S. PATENT DOCUMENTS

| | | | | |
|---|---|---|---|---|
| 9,142,385 | B1 * | 9/2015 | Iwanaga | A61N 5/1043 |
| 9,867,272 | B2 * | 1/2018 | Lal | H01J 37/06 |
| 9,962,560 | B2 * | 5/2018 | Zwart | G21K 1/046 |
| 10,362,666 | B2 * | 7/2019 | Mustapha | H05H 7/02 |
| 10,925,147 | B2 * | 2/2021 | Cooley | A61N 5/1045 |
| 2011/0216886 | A1 * | 9/2011 | Ho | H05H 9/04 315/505 |
| 2013/0063052 | A1 * | 3/2013 | Ho | H05H 9/02 315/505 |
| 2015/0174429 | A1 * | 6/2015 | Zwart | A61N 5/1083 250/396 R |
| 2016/0174355 | A1 * | 6/2016 | Lal | H05H 9/045 315/505 |
| 2017/0157424 | A1 * | 6/2017 | Zwart | A61N 5/1043 |
| 2017/0157425 | A1 * | 6/2017 | Zwart | A61N 5/1045 |
| 2017/0182338 | A1 * | 6/2017 | Zwart | A61N 5/1077 |
| 2018/0343733 | A1 * | 11/2018 | Mustapha | H05H 9/042 |
| 2022/0152421 | A1 * | 5/2022 | Chiap | H05H 9/04 |
| 2022/0201833 | A1 * | 6/2022 | Bourne | H05H 9/042 |
| 2023/0019382 | A1 * | 1/2023 | Doherty | H05H 9/048 |
| 2023/0262868 | A1 * | 8/2023 | Shinton | A61N 5/1077 315/505 |

FOREIGN PATENT DOCUMENTS

| | | | | | |
|---|---|---|---|---|---|
| GB | 1481487 | A | * | 7/1977 | H05H 9/04 |
| JP | 0676992 | | | 3/1994 | |
| JP | 07235399 | A | | 9/1995 | |
| JP | 2001305300 | | | 10/2001 | |
| JP | 2011165544 | A | | 8/2011 | |
| RU | 2392782 | | | 6/2010 | |
| WO | WO-2011109668 | A2 | | 9/2011 | |

OTHER PUBLICATIONS

"International Application Serial No. PCT/EP2020/087154, International Search Report dated Apr. 13, 2021", (Apr. 13, 2021), 4 pgs.
"International Application Serial No. PCT/EP2020/087154, Written Opinion dated Apr. 13, 2021", (Apr. 13, 2021), 8 pgs.
Benson, Stephen V., et al., "Status report on the Stanford Mark III infrared free electron laser", Nuclear Instruments and Methods in Physics Research Section A: Accelerators, Spectrometers, Detectors and Associated Equipment 272.1-2, (1988), pp. 22-28.
Huang, Y. C., et al., "Electron beam characterization for a compact far-infrared free-electron laser", IEEE journal of quantum electronics 31.9, (1995), pp. 1637-1641.
Travier, Christian, et al., "Rf guns: bright injectors for FEL", Nuclear Instruments and Methods in Physics Research Section A: Accelerators, Spectrometers, Detectors and Associated Equipment 304.1-3, (1991), pp. 285-296.
"United Kingdom Application Serial No. 1918793.9, Examination Report dated Jul. 4, 2022", (Jul. 4, 2022), 4 pgs.
"United Kingdom GB1918793.9, Examination Report under Section 18(3) dated Dec. 12, 2022", (Dec. 12, 2022), 3 pgs.
"Chinese Application No. 202080097065.6, Office Action dated Oct. 17, 2024", w English Translation, (Oct. 17, 2024), 15 pgs.

* cited by examiner

RADIOTHERAPY DEVICE

PRIORITY APPLICATIONS

This application is a U.S. National Stage Filing under 35 U.S.C. § 371 from International Application No. PCT/EP2020/087154, filed on Dec. 18, 2020, and published as WO2021/123256 on Jun. 24, 2021, which claims the benefit of priority to United Kingdom Application No. 1918793.9, filed on Dec. 19, 2019; the benefit of priority of each of which is hereby claimed herein, and which applications and publication are hereby incorporated herein by reference in their entirety.

FIELD

This disclosure relates to the field of particle accelerators, and more specifically to linear accelerators, for producing beams of electrons or other charged particles.

BACKGROUND

Radiotherapy devices are an important tool in modern cancer treatment. Radiotherapy devices are large, complex machines, with many moving parts and inter-operating mechanisms. Despite precision engineering and rigorous testing, some component parts of a radiotherapy machines may start to degrade over the lifetime of the machine. An example of a radiation source for producing an electron beam is a linear accelerator (LINAC). Clinical LINAC devices are configured to deliver high energy radiation to a patient.

Linear accelerators (especially those for medical use) accelerate electrons, or other charged particles, to relativistic speeds along an acceleration path through a waveguide. A source of electrons, for example an electron gun, is configured to inject electrons into the waveguide. The electrons are injected by the electron gun and accelerated through the waveguide. A radiofrequency (RF) electromagnetic wave is applied to the waveguide which provides an oscillating electric field within the waveguide to accelerate the electrons. The accelerated electrons hit a target and produce X-rays for medical use, for example radiotherapy treatment.

Linear accelerators sometimes become damaged due to the complexity of the machinery and the many operating mechanisms. In particular, damage may occur to the electron gun. This leads to machine downtime for servicing and replacement of the gun. Such an event is inconvenient, as it adds time to the treatment, and in some cases means the treatment session must finish prematurely. Unplanned equipment downtime can disrupt planned treatment schedules, and may be expensive for the owner, be it due to loss of revenue, servicing and repair costs, or both.

In some cases, damage to the electron gun occurs when electrons move in a backwards direction, towards the electron gun, rather than being accelerated along the electron beam bath. This is a phenomenon known as back bombardment.

The present invention seeks to address these, and other disadvantages, encountered by back bombardment of electrons by providing an improved waveguide for use in radiotherapy.

SUMMARY

An invention is set out in the independent claims. Optional features are set out in the dependent claims.

BRIEF DESCRIPTION OF THE DRAWINGS

Specific embodiments are described below by way of example only and with reference to the accompanying drawings in which.

DETAILED DESCRIPTION

The present disclosure relates to a waveguide for use in a particle accelerator, for example a linear accelerator. The linear accelerator may be suitable for use in a radiotherapy device. The radiotherapy device may be suitable for delivering a beam of radiation to a patient in order to treat a tumour.

In particular, the present application relates to protecting the electron guns used in particle accelerators and protecting the cathode of an electron gun. Such techniques are advantageous as they allow for an increased lifetime of the electron gun. This allows a manufacturer or maintenance service provider to attend the machine less regularly, therefore saving time and preventing costly repairs. The disclosed techniques allow the electron gun to be protected from the effects of backbomardment, and hence the lifetime of the electron gun cathode filaments can be extended. The disclosed techniques help to reduce machine downtime and thereby minimise disruption to the machine's normal operation. The disclosed techniques can also be used to produce electron beams with greater current and therefore deliver a higher dose to patients. This in turn reduces treatment time and allows more patients to be treated within a given time period.

Figure 1:
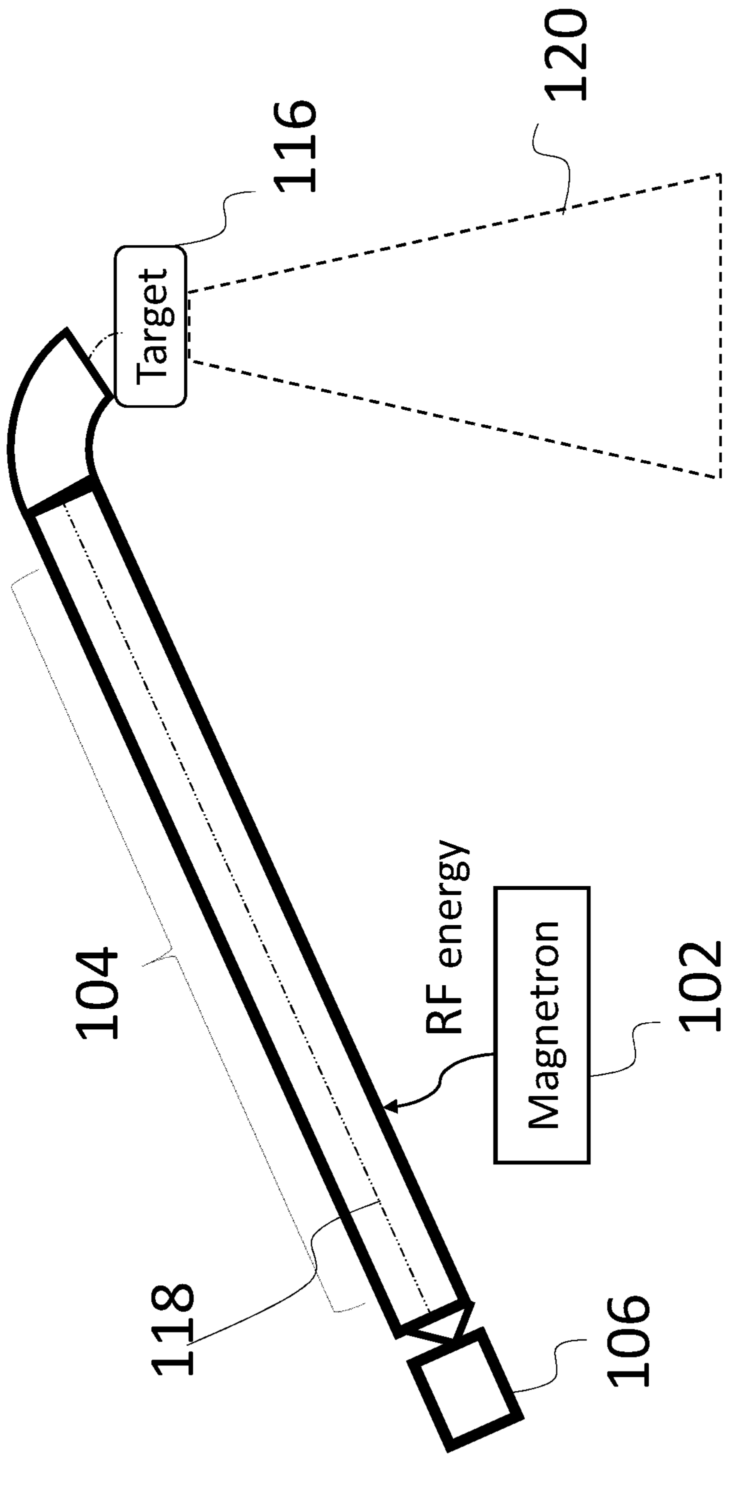
FIG. 1 illustrates a schematic illustration of a LINAC device.

FIG. 1 depicts a LINAC suitable for delivering, and configured to deliver, a beam of radiation to a patient during radiotherapy treatment. In operation, the LINAC device produces and shapes a beam of radiation and directs it toward a target region within the patient's body in accordance with a radiotherapy treatment plan.

A medical LINAC machine is by necessity complex, with many inter-operating component parts. A brief summary of the operation of a typical LINAC will be given with respect to the LINAC device depicted in FIG. 1, which comprises a source of radiofrequency waves 102, a waveguide 104, a source of electrons 106, a heavy metal target 116 which produces X-rays 120 when hit by an electron beam 118, and a treatment head which houses various apparatus configured to, for example, collimate and shape the resultant X-ray beam.

The source 102 of radiofrequency waves, such as a magnetron, produces radiofrequency waves. The source 102 of radiofrequency waves is coupled to the waveguide 104 and is configured to pulse radiofrequency waves into the waveguide 104. A source 106 of electrons, such as an electron gun, is coupled to the waveguide 104 and is configured to inject electrons into the waveguide 104. In the source 106 of electrons, electrons are thermionically emitted from a cathode filament as the filament is heated. The temperature of the filament controls the number of electrons injected. The injection of electrons into the waveguide 104 is synchronised with the pumping of the radiofrequency waves into the waveguide 104. The design and operation of the radiofrequency wave source 102, electron source 106 and the waveguide 104 is such that the radiofrequency waves accelerate the electrons to very high energies as they propagate through the waveguide 104. The design of the waveguide 104 depends on whether the LINAC accelerates the electrons using a standing wave or travelling wave, though the waveguide typically comprises a series of cells or cavities, each cell connected by a hole or 'iris' through which the electron beam 118 may pass. The acceleration cells are coupled in order that a suitable electric field pattern is produced which accelerates electrons propagating through the waveguide 104.

As the electrons are accelerated in the waveguide 104, the electron beam path 118 is controlled by a suitable arrangement of steering magnets, or steering coils, which surround the waveguide 104. The arrangement of steering magnets may comprise, for example, two sets of quadrupole magnets.

To ensure that propagation of the electrons is not impeded as the electron beam 118 travels toward the target, the waveguide 104 is evacuated using a vacuum.

When the high energy electrons hit the target, X-rays are produced in a variety of directions. At this point, a collimator blocks X-rays travelling in certain directions and passes only forward travelling X-rays to produce a cone shaped beam. The beam can be shaped in various ways by beam-shaping apparatus, for example by using a multi-leaf collimator, before it passes into the patient as part of radiotherapy treatment.

In some implementations, the LINAC is configured to emit either an X-ray beam 120 or an electron particle beam (not shown). Such implementations allow the device to provide electron beam therapy, i.e. a type of external beam therapy where electrons, rather than X-rays, are directed toward the target region. It is possible to 'swap' between a first mode in which X-rays are emitted and a second mode in which electrons are emitted by adjusting the components of the LINAC.

The LINAC device also comprises several other components and systems. As will be understood by the person skilled in the art, a LINAC device used for radiotherapy treatment will have additional apparatus such as a gantry to support and rotate the LINAC, a patient support surface, and a controller or processor configured to control the LINAC apparatus.

Figure 2:
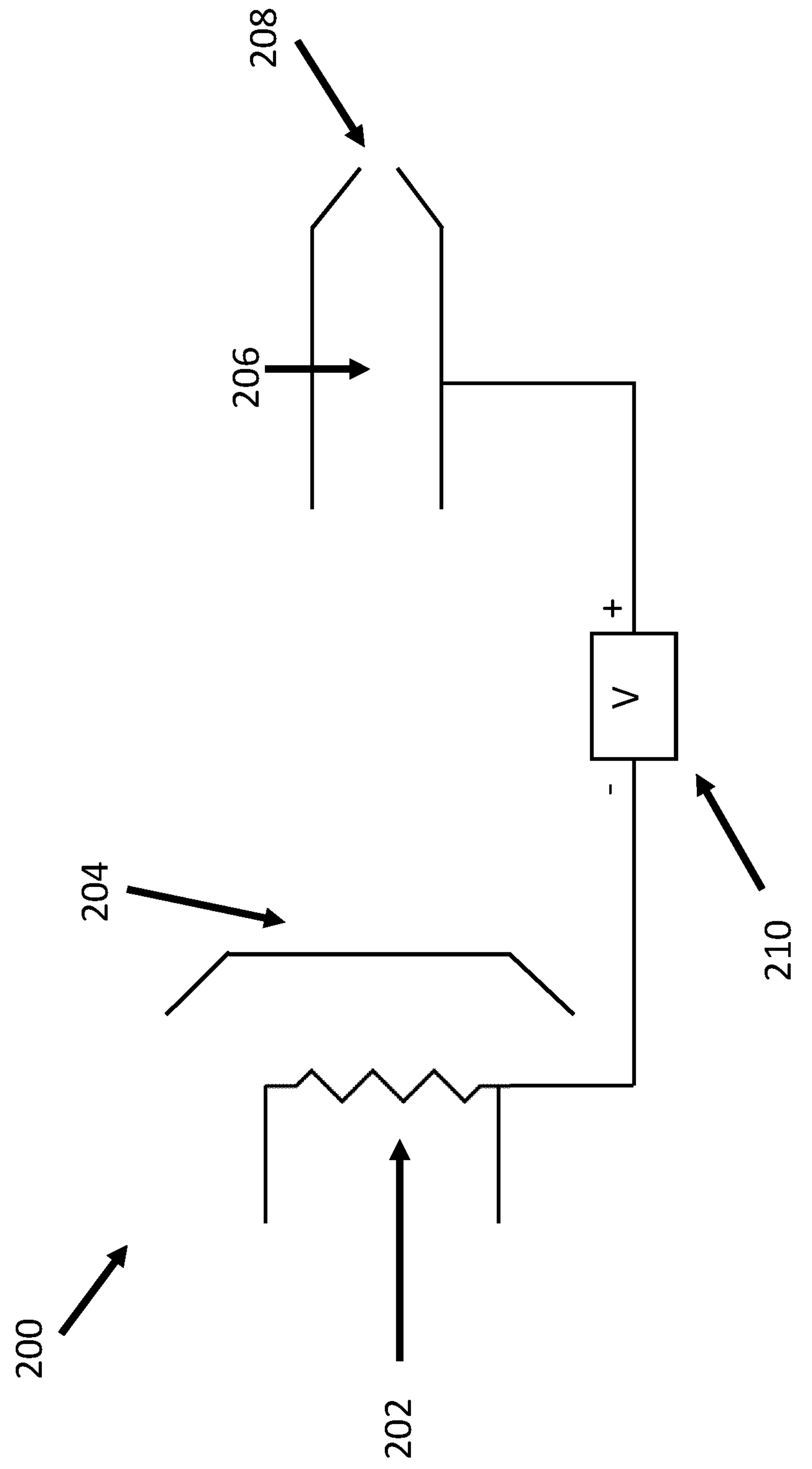
FIG. 2 illustrates an electron gun.

FIG. 2 depicts an electron gun 200 (i.e. source of electrons) suitable for generating and inputting electrons into the waveguide. The electron gun 200 injects electrons into the waveguide to create an electron beam. The electron gun 200 comprises a metal plate 204 (also known as the cathode) heated by a small filament wire 202 connected to a low voltage 210. Some conduction electrons are free to move in the metal as they are not bound to ions in the lattice. As the metal plate 204 is heated, the electrons gain kinetic energy. Some of them gain enough kinetic energy to escape from the surface of the metal plate 202. The whole electron gun 200 is placed in a vacuum, because in a vacuum the evaporated electrons are free to move without being quickly absorbed, as would happen in air. The electrons are pulled away from the hot surface of the metal plate 204 by putting an anode 206 (positive electrode) nearby. The anode 206 is created by connecting an electrode to the positive terminal of a power supply 210, and the metal plate 204 (or cathode) is connected to the negative terminal of the power supply 210. Due to electrostatic attraction the electrons are pulled towards the anode 206. There is a small hole in the anode 206 that some electrons will pass through, forming a beam of electrons. The anode includes a hole where the electrons can exit the electron gun 200. The anode shown in FIG. 2 includes a nozzle 208 where the electrons exit the electron gun 200. The nozzle may be formed in various shapes and sizes and is not restricted to the depiction shown in FIG. 2. The nozzle is not an essential feature of the electron gun.

The electron gun 200 may also have a control grid (not shown). The control grid is an electrode used to control the flow of electrons from the metal plate 204 to the anode 206 electrode. The control grid is located between the metal plate 204 and the anode 206. The control grid between the metal plate 204 and anode 206, functions as a gate to control the current of electrons reaching the anode 206. A negative voltage on the grid will repel the electrons back toward the cathode so fewer get through to the anode. A 'less' negative, or positive, voltage on the grid will allow more electrons through, increases the anode 206 current and therefore increases the current of electrons emitted from the electron gun 200.

An RF electrical field is present in the waveguide. The electrons input into the waveguide may be accelerated or decelerated due to the statistical output of the electron gun 200. As the electrons enter the waveguide those which enter on the crest of the RF wave are accelerated, this is known as "in phase". Those that enter on the trough of the RF wave are decelerated, this is known as "out of phase". Those entering between these times gain some acceleration or deceleration. This way bunches are formed. Those that enter significantly off axis, or traversing the axis, may not become part of the bunch and, due to the RF, may end up returning towards electron gun and therefore towards the cathode 204.

Figure 3:
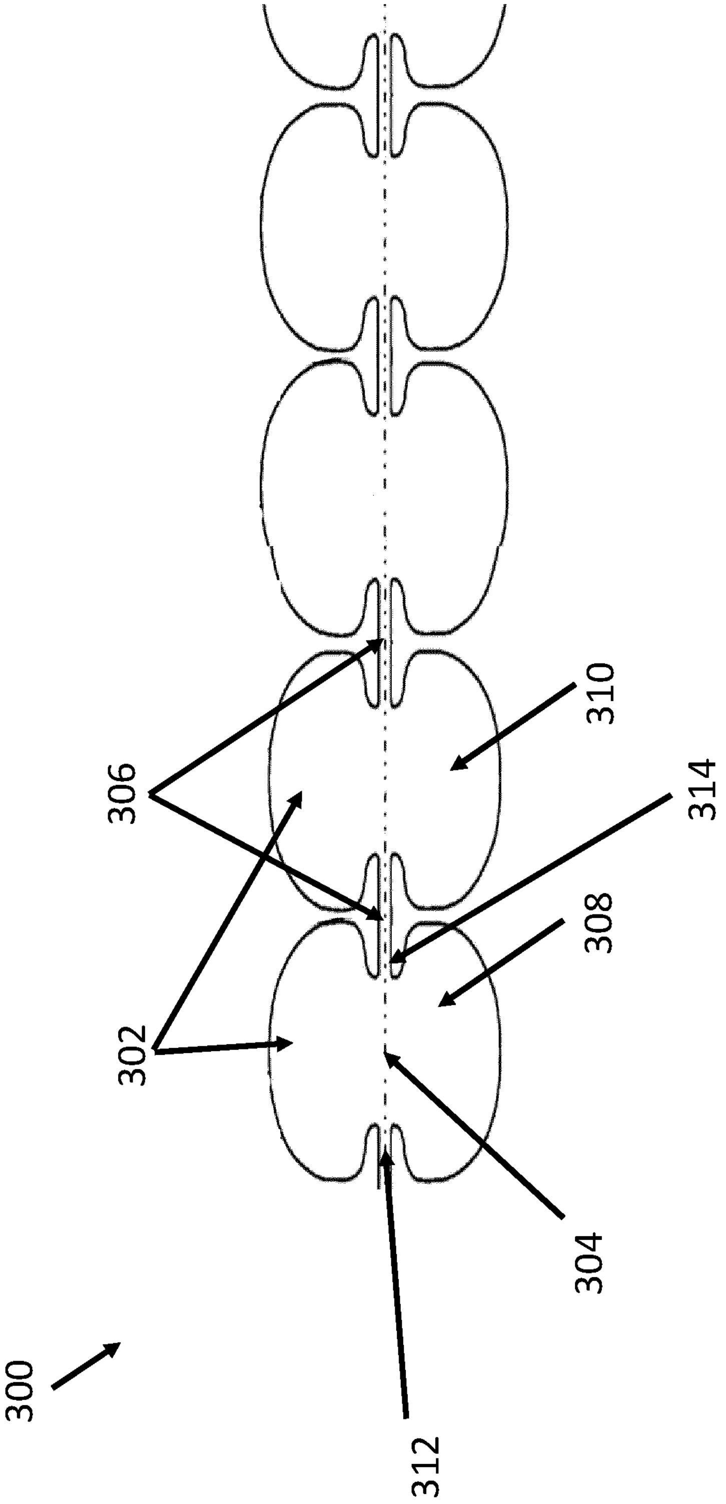
FIG. 3 illustrates a waveguide.

FIG. 3 illustrates a portion of a known waveguide 300. Four acceleration cells 302 of a series of connected acceleration cells are shown. The acceleration cells are each connected along a central axis 304 by irises 306. Only four acceleration cells 302 are illustrated in FIG. 2, although a typical waveguide will have more. The precise number will vary, dependent on the design criteria of the accelerator. Each cell is defined in the form of a recess within a surrounding shell of a conductive material, usually copper.

The source (not shown) of radiofrequency waves is coupled to the waveguide 300 and is configured to pulse radiofrequency waves into the waveguide 300. Radiofrequency waves pass from the source of radiofrequency waves through an RF input window. The design and operation of the radiofrequency wave source, electron source and the waveguide 300 is such that the radiofrequency waves accelerate the electrons to very high energies as they propagate through the waveguide 300. The design of the waveguide 104 depends on whether the LINAC accelerates the electrons using a standing wave or travelling wave. The acceleration cells 302 are coupled in order that a suitable electric field pattern is produced which accelerates electrons propagating through the waveguide 300. The electric field pattern accelerates electrons along an acceleration path. The acceleration path is along the central axis 304 of the acceleration cells 302.

Figure 4A:
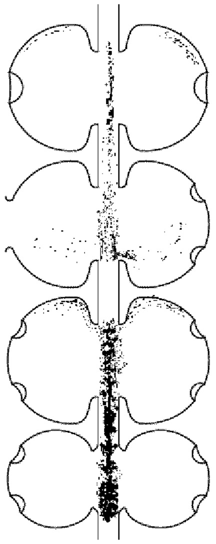
FIGS. 4*a* to 4*c* illustrate a series of simulations of electrons in a waveguide displaying back bombardment.
Figure 4B:
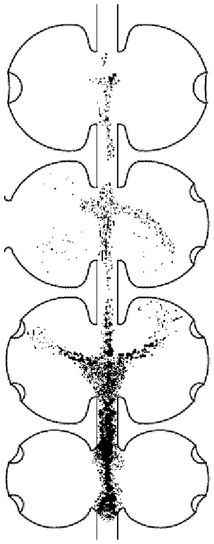
Figure 4C:
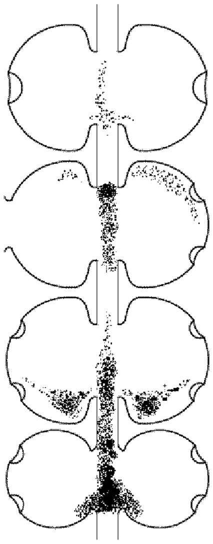

Electrons enter the input accelerating cell 308 at the first end 312 of the input accelerating cell 308. The source of electrons is located at the first end 312 and connected to the first end 312 to input the electrons into the input accelerating cell 308. When an electron enters the input accelerating cell 308 in the waveguide 300 it is accelerated by the electric field. The electrons traveling in the forwards direction, along the central axis 304 of the waveguide 300, gain energy and accelerate in a forward direction towards a second end 314 of the input accelerating cell 308 and eventually into a second acceleration cell 310, see FIG. 4*a*. Some electrons emitted out of phase relative to the RF phase do not gain enough energy to exit the input accelerating cell 308 before the oscillating electric field reverses. The reserved oscillating electric field accelerates the electrons in a backwards direction, towards the first end 312 of the input accelerating cell 318, see FIGS. 4*b* and 4*c*. This is a phenomenon known as back bombardment. This effect is most pronounced when the electrons are emitted into the input accelerating cell at substantially 180 degrees out of phase relative to the RF phase. Back bombardment can occur in any accelerating cell, however it is most damaging to the source of electrons when it occurs in the input accelerating cell 308.

The back bombardment process has adverse effects on machine performance, including damage to the source of electrons. For example, the electron gun 200 and more specifically the cathode 204 of the electron gun 200 can be damaged by rebounding electrons. The energy obtained from the RF waves causes acceleration of the backward moving electrons and causes their speed to increase and thereby increasing the amount of damage that they cause. The backward moving electrons may collide with the cathode 204, so that the electrons deposit their kinetic energy in the form of heat, such that the cathode 204 temperature increases. When the heat of the cathode 204 increases more electrons are emitted from the cathode 204. This can cause the electron gun 200 to fault or even be completely damaged, therefore reducing the lifetime of the electron gun 200. For grid-controlled electron guns, the returning electrons can damage the grid. Additionally, this may lead to a runaway condition in which back-bombardment leads to more cathode 204 heating, causing the emission of more electrons, which in turn leads to more back-bombardment creating a feedback cycle. Damage caused to the electron gun 200 causes machine downtime as servicing and replacement of the gun must be done on a regular basis. This causes a reduction in the amount of time that can be spent treating patients.

The linear accelerator may also comprise a target (typically made from tungsten) to generate X-rays when the target (not shown) is subjected to electron beam bombardment. To treat patients more quickly it is desirable to give higher dosage rate of X-rays to a patient. To achieve this a higher incident power of the electron beam must be produced on the target by increasing the RF, to accelerate the electrons to higher speeds. However, a larger RF accelerates the electrons moving in both the forward and backward direction and increases the speed of the electrons returning to the electron gun. In practice this leads to a maximum limit on electron current that the machine may produce, because electrons traveling in the backwards direction with greater speed impart more heat to the electron gun and cause more damage. This leads to a limit on the dosage rate of X-rays and therefore also a limit on the rate at which patients can be treated.

Therefore, it is desirable to provide a medical linear accelerator with reduced back bombardment to prolong the service life of the electron gun and to allow the linear accelerator to treat patients more quickly.

One solution to mitigating the problem of back bombardment provided herein is to place a magnet arrangement between the source of electrons (i.e. electron gun) and the waveguide to prevent back bombarded electrons from reaching the source of electrons.

Figure 5:
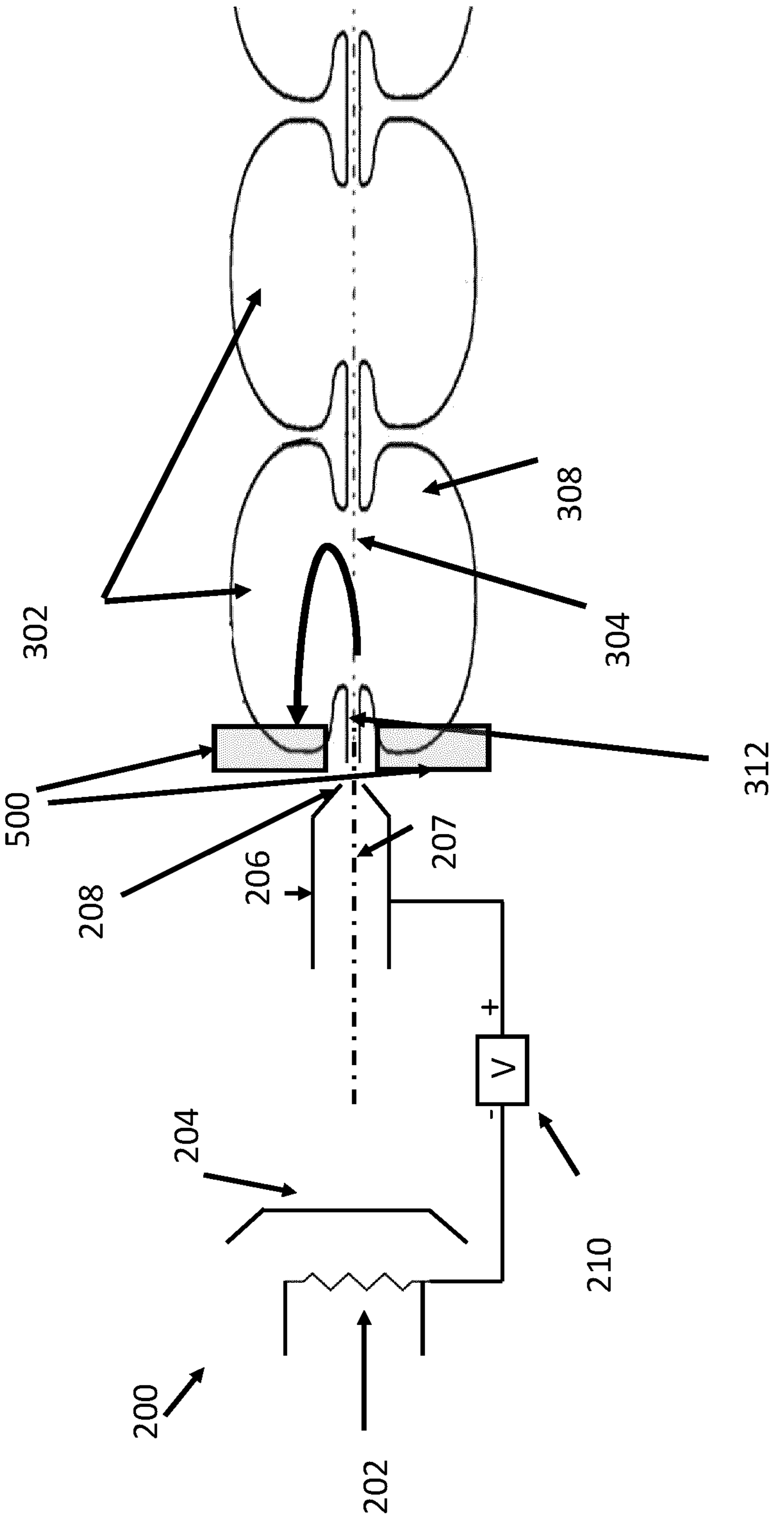
FIG. 5 illustrates an electron gun, linear accelerator and a magnet arrangement.

FIG. 5 shows a waveguide for use in a particle accelerator, for example a linear accelerator. The waveguide 300 includes a series of acceleration cells 302. The first acceleration cell is the input acceleration cell 308 where electrons enter into the waveguide 300. The waveguide 300 also comprises a source of electrons 200, for example an electron gun. The source of electrons directs a beam of electrons 207 into the input acceleration cell 308. When the beam of electrons 207 enters the input acceleration cell 308 in the waveguide 300 it is accelerated by the electric field. The beam of electrons 207 is directed towards the output acceleration cell (not shown). The beam of electrons 207 is directed along the central axis 304 of the acceleration cells. The output acceleration cell is located at an opposing end of the waveguide compared to the first acceleration cell 308. Both the output acceleration cell and input acceleration cell 308 are located along the central axis 304 axis of the waveguide at opposing ends. There may be a target located adjacent to the output cell and the end of the waveguide. Electrons hit the target and produce X-rays for medical use, for example radiotherapy treatment. Alternatively, there may not be a target and the electron beam itself can be used to treat patients.

The waveguide includes magnet arrangement 500. The magnet arrangement 500 can be positioned adjacent to the acceleration cells. The magnet arrangement 500 can be located in the input acceleration cell 308 or in any of the series of acceleration cells. In FIG. 5 the magnet arrangement 500 is located at the first end 312 of the input acceleration cell 308. The magnet arrangement is located an intersection between the source of electrons 200 and the input acceleration cell 308. The magnet arrangement 500 is located at a nozzle 208 of the source of electrons. Where the source of electrons is an electron gun the nozzle 208 is a hole in the electron gun. Electrons exit the source of electrons via the nozzle 208. The nozzle 208 is connected to the first end 312 of the input accelerating cell 308. The nozzle 208 allows electrons to leave the electron gun 200 and enter the input accelerating cell 308. The nozzle 208 may form the boundary between the electron gun 200 and the waveguide. The nozzle 208 is kept under vacuum conditions.

If the electron gun were located off axis (not shown) such that it was not along the central axis of the acceleration cells, then the location of the magnet arrangement 500 would change accordingly. The magnet arrangement 500 is located adjacent to the source of electrons 200 to prevent back bombarded electrons from damaging the source of electrons. The magnet arrangement 500 is located an intersection between the source of electrons 200 and the input acceleration cell 308.

Figure 6B:
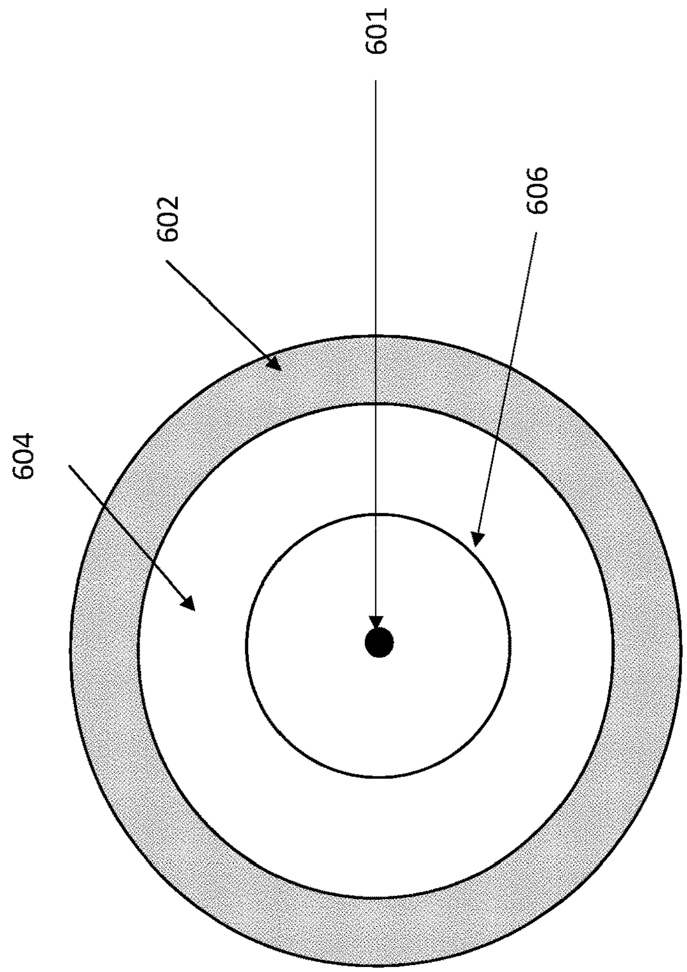
FIGS. 6*a* and 6*b* illustrate a magnet arrangement in a linear accelerator.
Figure 6A:
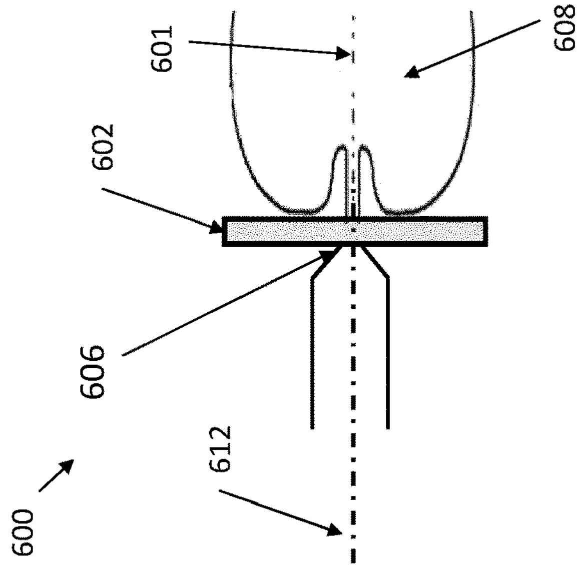

FIGS. 6*a* and 6*b* show an embodiment in which a magnet arrangement 500 is formed in a ring 602 around central axis of the acceleration cells 601 as shown in FIGS. 6*a* and 6*b*. FIG. 6*a* shows the ring 602 magnet arrangement formed around the central axis of the acceleration cells. FIG. 6*b* shows the same embodiment as shown in FIG. 6*a* when viewed along the central axis of the acceleration cells 601. The central axis of the acceleration cells 601 corresponds to the beam of electron 612 emitted from the source of electrons. The ring 602 magnet arrangement may have a cylindrical shape with an inner portion 604 removed to allow the waveguide to be fitted inside the inner portion 604. The ring may have a radius equivalent to the radius of the radius of the waveguide. The ring 602 is formed around the beam of electrons 612. The ring 602 is located an intersection between the source of electrons and the input acceleration cell 608. The ring can be formed around the nozzle 606. The nozzle 606 injects electrons into the acceleration cell.

The magnet arrangement 500 may be formed of a single magnet or a series of magnets. The magnet arrangement 500 comprises at least one wire with an electrical current running through the wire to produce a magnetic field. The magnet arrangement 500 is formed of magnets that are used to focus and steer the beam of electrons. The magnet arrangement 500 is formed by electric currents running through wires to produce a magnetic field. The magnetic field is used to move the negatively charged electrons.

Figure 6C:
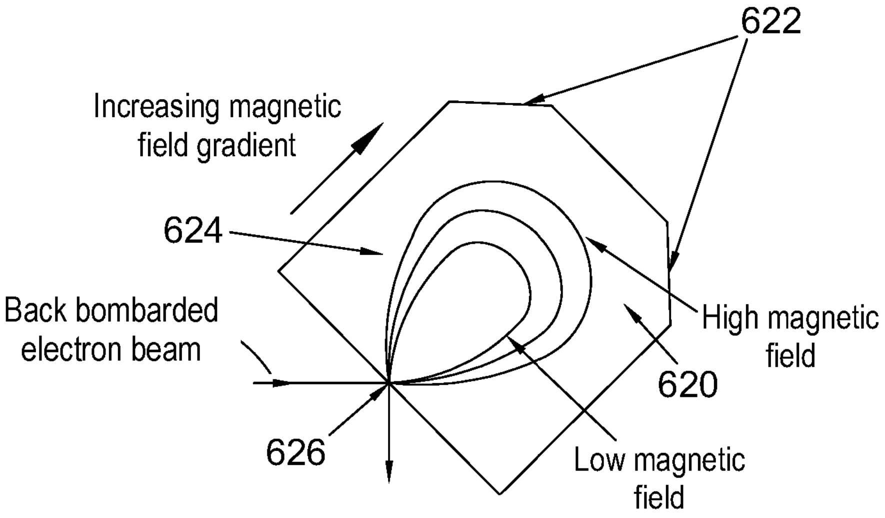
FIGS. 6*c* and 6*d* illustrate the use of an alpha magnet in the magnet arrangement.

The magnet arrangement 500 may comprise one or more alpha magnets. An example of an alpha magnet is shown in FIG. 6*c*. An alpha magnet is a type of magnet that can be used to deflect a beam by 270 degrees, as shown in FIG. 6*c*. Alpha magnets are used in radiotherapy machines for electron beam bending to direct the beam of electrons produced by a linear accelerator towards a target. Alpha magnets are suitable for use in radiotherapy systems and can provide focusing for a spread of energies in a beam to a small focal spot. For example, high energy medical electron linacs are usually mounted horizontally, as shown in FIG. 1, and the emergent electron beam from the accelerating tube is deflected magnetically through 90° or 270° into a vertical plane to hit an X-ray target or electron scatterer. The present invention applies alpha magnet technology to mitigate against back-bombardment.

FIG. 6*c* shows a square-shaped alpha magnet 620 with chamfered edges 622. The square-shaped alpha magnet 620 has a beam channel 624 carved out of it. The alpha magnet may be formed in any shape. The beam channel 624 is where the electron beam is directed, and the electron beam is bent around this channel. The electrons enter and exit the alpha magnet at the same entrance/exit point 262. The alpha magnet has a magnetic field strength that increases with increasing distance from the entrance/exit point 262. The magnetic field gradient is labelled in FIG. 6*c*. There is a minimum magnetic field acting on the electrons when they first enter the alpha magnet and there is a maximum magnetic field when the electrons are furthest from the entrance/exit point. Areas of high and low magnetic field are labelled on FIG. 6*c*. The alpha magnet is an electromagnet and the magnetic field can be adjusted by, for example, adjusting the current within the electromagnet.

The alpha magnet shown in FIG. 6*c* can bend a beam of electrons by 270 degrees. A single alpha magnet can be used to redirect electrons away from the source of electrons. The alpha magnet is achromatic, meaning that electrons of different energies are focussed to the same point. This can be seen from the different electron beam paths shown in FIG. 6*c*. Electrons of different energies are accelerated and decelerated at different rates, however all these electrons exit the alpha magnet at the same position.

Figure 6D:
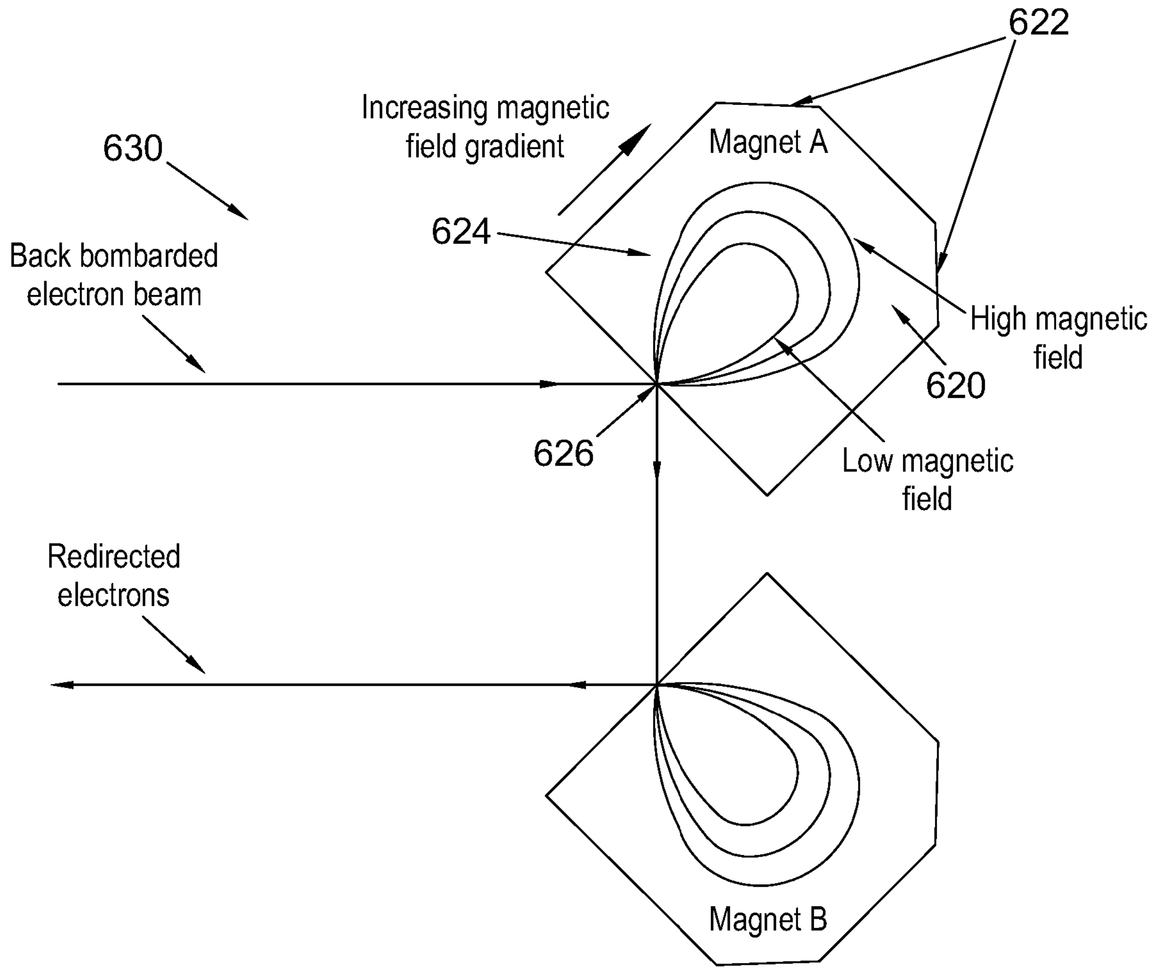

FIG. 6*d* shows the magnet arrangement 630 comprising a first alpha magnet and a second alpha magnet. In the example in the figures, both the first alpha magnet (magnet A) and the second alpha magnet (magnet B) are identical and are the same as the single magnet shown in FIG. 6*c*. The first alpha magnet (magnet A) and the second alpha magnet (magnet B) are positioned next to each other. The first alpha magnet (magnet A) is angled at 90 degrees to the second alpha magnet (magnet B). The magnet arrangement is arranged such that back-bombarded electrons traveling towards the electron gun are, firstly, redirected by an angle of 270 degrees by the first alpha magnet, and secondly, they are redirected by an angle of 270 degrees by the second alpha magnet. As shown in FIG. 6*d*, this combination of alpha magnet arrangement means that the back-bombarded electrons are overall redirected by an angle of approximately 180 degrees. This means that the back-bombarded electrons can join the beam of electrons being accelerated along the central axis 601 of the acceleration cells.

It is advantageous to use two alpha magnets as the magnetic field can be adjusted to alter the angle of the redirected electrons (not shown). For example, back bombarded electrons can be travelling in a variety of directions when they reach the alpha magnets. It is therefore desirable to ensure that the redirected electrons are redirected by the exact angle needed to allow the electrons to join the beam of electrons being accelerated along the central axis 601 of the acceleration cells. The angle of the redirected electrons can be altered by adjusting the angle between the alpha magnets or by altering the magnetic fields within the alpha magnets.

The alpha magnet arrangements shown in FIGS. 6*c* and 6*d* can be arranged in the ring formation shown in FIGS. 6*a* and 6*b*. These type of magnet arrangements are applicable to a standing waveguide or a travelling waveguide. The alpha magnets can require a cooling mechanism (not shown) to prevent overheating.

To use an alpha magnet arrangement as shown in FIGS. 5 and 6, it would also be desirable to move the electron gun off axis (not shown), such that it is not along the central axis of the acceleration cells. This ensures that the magnetic field of the magnet arrangement does not affect the electrons when they first enter the input accelerating cell 308. To achieve this, the beam of electrons entering the input acceleration cell from the 'off axis' electron gun will be bent by using an electron gun magnet arrangement. When some of these electrons experience back bombardment, they will be redirected by the magnet arrangement, in the same manner as previously discussed.

The magnet arrangement 500 prevents back bombarded electrons from reaching the source of electrons 200. The magnet arrangement 500 can prevent the back bombarded electrons from reaching the source of electrons 200, by slowing them down and in some cases making them stationary. The magnet arrangement can repel back bombarded electrons, which have deviated from the beam of electrons 304, away from the source of electrons. The electrons are repelled by the magnet arrangement towards an output acceleration cell. The repelled electrons may join the beam of electrons.

Alternatively, the magnet arrangement is formed to be a magnetic trap. A magnet trap holds electrons at a point such that they are not moving. Such traps work because most charged particles interact with a magnetic field through their magnetic dipole moment. If the charged particle is moving in a magnetic field, it will gain and lose energy as the strength of the magnetic field near the charged particle changes. Making a magnetic field that increases in all directions from a central minimum point means that charged particles will gain potential energy and lose kinetic energy if they move away from the minimum. Charged particles that have low enough total energy will convert all of their kinetic energy to potential energy and be reflected from higher magnetic field and be trapped. When the magnet arrangement is formed of a magnet trap, the electrons can be prevented from reaching the source of electrons because the magnets slow down the electrons and trap them inside the waveguide so that they cannot reach the source of electrons.

Alternatively, the magnet arrangement can be used to redirect electrons away from the waveguide 300 entirely. For example, the magnet arrangement 500 can be used to redirect the back-bombarded through a hole in the electron gun 200. This hole can be formed in the metal plate 204 (also known as the cathode) and filament wire 202 of the electron gun 200. This has the advantage of negating the need for an off-axis gun. Once electrons leave the gun they are quickly absorbed and cannot cause damage to the electron gun.

The repelled electrons may join the beam of electrons 304. As the electrons re-join the beam of electrons 304 this increases the current of the beam. In turn, this increases the efficiency of the waveguide 300 and allows a stronger current to be used for treating patients. Increasing the dosage rate mean that patients can be treated more quickly and prevents damage to healthy tissue. In normal waveguide systems, the current is usually increased by increasing the current through the electron gun to produce more electrons, however, many of these electrons produced are wasted when the electrons 'back bombard' in the wrong direction and do not contribute to the overall output of the beam of electrons 304. This means by using a magnet arrangement 500 to prevent back bombarded electrons from reaching the source of electrons 200 and to redirect the electrons to re-join the electron beam, the number of electrons output through the waveguide 300 can be increased without adjusting the current of the source of the electrons 200.

As previously described, back bombardment processes have adverse effects on machine performance, including damage to the source of electrons. For example, the electron gun 200 and more specifically the cathode 204 of the electron gun 200 can be damaged by rebounding electrons. When backward moving electrons collide with the cathode 204, the electrons deposit their kinetic energy in the form of heat, such that the cathode 204 temperature increases. This effect is removed by using magnets which trap the electrons. Therefore, this allows greater control over the emission of electrons as the temperature of the cathode 204 can be regulated. Additionally, the damage to the electron gun 200 can be restricted as it overheats less. This prevents machine downtime and allows the waveguide to be used continually with reduced risk of failure.

It was previously described how it is desirable to treat patients more quickly. This can be done by providing a higher dosage rate of X-rays to a patient. To achieve this a higher incident power of the electron beam must be produced on the target by creating a larger electron beam current. When electrons are back bombarding and hitting the electron gun, in practice this leads to a maximum limit on electron current that the machine may produce, because electrons traveling in the backwards direction with greater speed impart more heat to the electron gun and cause more damage. This limit on the dosage rate of X-rays can be overcome when using the magnet arrangement 500. Intentional heating of the cathode to produce more electrons and a higher electron current can be increased without fear of the cathode overheating from back bombarding electrons.

Another solution to mitigating the problem of back bombardment provided herein is to use a diversion channel to remove back bombarded electrons from the waveguide 300 and prevent back bombarded electrons from reaching the source of electrons 200.

The diversion channel may be configured to remove electrons from the waveguide or to redirect the electrons inside the series of acceleration cells, for example by spraying the electrons on the walls of the cells to reduce the effects of back bombardment.

Figure 7:
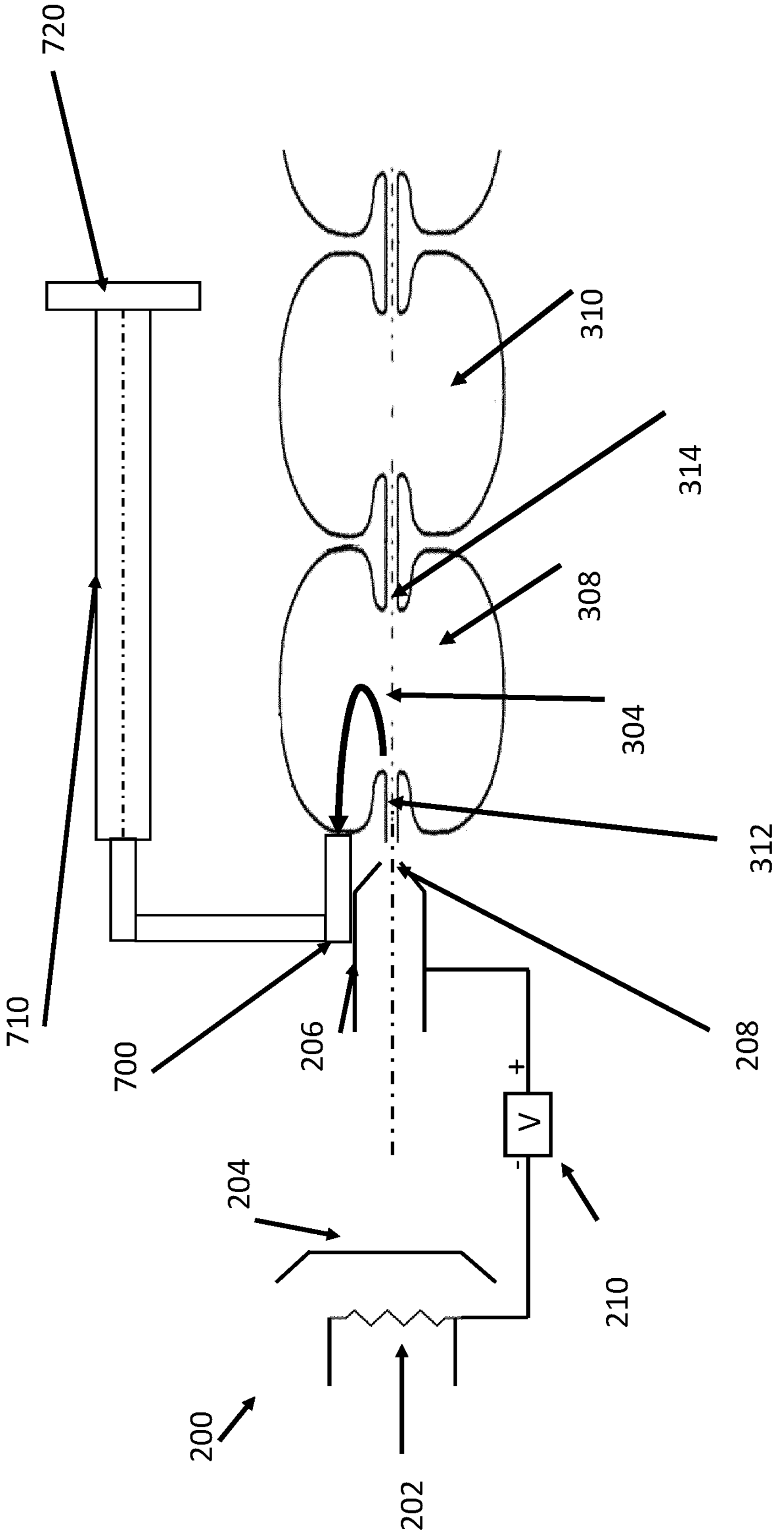
FIG. 7 illustrates linear accelerator comprising a diversion channel.

FIG. 7 shows an embodiment of a waveguide comprising a diversion channel 700 used to remove electrons from the waveguide. The waveguide is for use in a particle accelerator, for example a linear accelerator. A waveguide 700 works in a similar way to the waveguide in FIGS. 3 and 5. That is the waveguide comprises a series of acceleration cells. The first acceleration cell is the input acceleration cell 308 where electrons enter into the waveguide 300. The waveguide 300 also comprises a source of electrons 200, for example an electron gun. The source of electrons directs a beam of electrons 206 into the input acceleration cell 308. When the beam of electrons 206 enters the input acceleration cell 308 in the waveguide 300 it is accelerated by the electric field. The beam of electrons is directed towards the output acceleration cell (not shown). The beam of electrons is directed along the central axis of the acceleration cells. The output acceleration cell is located at an opposing end of the waveguide compared to the first acceleration cell. Both the output acceleration cell and input acceleration cell are located along the central axis 304 axis of the waveguide 300 at opposing ends. In the embodiment in FIG. 1, the waveguide includes a diversion channel 700. The diversional channel 700 is configured to remove electrons from the waveguide 300 which are travelling towards the source of electrons 200. The diversion channel 700 is configured to remove electrons from the input acceleration cell 308.

The diversion channel 700 has an opening which is located an intersection between the source of electrons 200 and the input acceleration cell 308. The diversion channel 700 is located at the first end 312 of the input accelerating cell 318. There may be one or more diversion channels 700. There may be multiple diversion channels 700 within the input accelerating cell 318, these diversion channels 700 may all lead to a single output. The multiple diversion channels 700 may be located at regular intervals around the acceleration cell, for example at multiple intervals around the first end of the input accelerating cell. There may also be diversion channels located at some or all of the series of acceleration cells. The diversion channels in each of the series of acceleration cells may lead to the same single output. The greatest yield of electrons can be achieved by having the diversion channel 700 in the input acceleration cell 318 as back bombarded electrons are most prevalent in this cell. The yield of the diversion channel 700 decreases the further away from the source of electrons 200 the diversion channel 700 is placed in an acceleration cell.

In one embodiment diversion channel 700 is formed in a ring around the circumference of the waveguide 300. The ring is located an intersection between the source of electrons 200 and the input acceleration cell 308. The ring diversion channel may be cylindrical with an inner portion removed to allow the waveguide or nozzle to be fitted inside the inner portion 603. The ring can be formed around the circumference of the nozzle 208.

The diversion channel 700 is configured to transport electrons away from the waveguide. In one embodiment the diversion channel 700 may be connected to a chamber (not shown) to deposit the electrons. This removes the electrons from the waveguide 300 and prevents these electrons damaging the source of electrons 200. The chamber is formed of a cavity surrounded by a panel. The panel is made from a surface that absorbs the electrons. The panel is constructed so that it can be replaced quickly and easily.

In another embodiment the diversion channel 700 is configured to accelerate a secondary beam of electrons. As shown in FIG. 7, the diversion channel 700 may be connected to a second particle accelerator 710. The second particle accelerator 710 is positioned along an axis parallel to the central axis of the accelerating cells 304. The diversion channel 700 includes a 180 degree bend to direct electrons into the second particle accelerator 710 which is positioned along an axis parallel to the central axis of the accelerating cells. The alpha magnet configuration shown in FIGS. 6*c* and 6*d* may be used to direct the electrons into the second particle accelerator 710. This works in the same way as described above for the redirecting of electrons inside the main particle accelerator. Two alpha magnets can be used to bend the path of electrons by 180 degrees as shown in FIG. 6*d*.

The second particle accelerator 710 also needs a second source of RF radiation to accelerate the electrons along the second particle accelerator 710. A second source of RF radiation is coupled to the second particle accelerator, for example a solenoid and magnetron. The second particle accelerator 710 has a waveguide and acceleration cells like the main particle accelerator. That is, the second particle accelerator 710 works in a similar way to the main particle accelerator, however the electrons enter the second particle accelerator 710 from the diversion channel 700 rather than the electron gun 200. Additionally, the diversion channel 700 itself may also require a source of RF radiation to ensure the electrons have enough energy to be channelled towards the second particle accelerator 710 and to bend the electrons by 180 degrees. The second source of RF radiation may be the same source of RF radiation used in the main particle accelerator. Alternatively, the second source of radiation could use power reflected from the source of RF radiation used in the main particle accelerator or reflected from elsewhere. The second source of radiation could use power extracted from higher order modes.

The second particle accelerator 710 and secondary beam of electrons are used for patient imaging. The second particle accelerator 710 is directed towards a second tungsten target 720. The target 720 is located adjacent to the second particle accelerator. The target 720 is typically made from tungsten. This produces a source of X-rays that may be used for imaging, whilst the main acceleration cells are used for their usual treatment purposes.

In an alternative embodiment, the second particle accelerator 710 could be configured to direct electrons so that they hit the same target (e.g. tungsten) that the series of accelerating cells is directed to (not shown). The radiation beam produced from this could be used for patient treatment or imaging. This embodiment has the advantage of recycling the back bombarded electrons and increasing the efficiency of the waveguide. The second particle accelerator 710 is positioned along an axis parallel to the central axis of the accelerating cells 304 to allow the second particle accelerator to direct electrons towards the target.

It is also possible that the waveguide can switch between the different uses described above. The electrons from the second particle accelerator may be used to for separate imaging or can be channelled to collide with the same target as the series accelerating cells is directed to. This reduces the amount of apparatus required to achieve different tasks. The switching mechanism can be aided by detuning cells. For example, as the same acceleration channel is being used for imaging and treatment, a lower power beam would be required for imaging than is required for treatment. It is therefore desirable to detune the cells to allow the power of the beam to be reduced when using acceleration channel for imaging. Similarly, the detuning can then be turned off again to allow the acceleration to be used for treatment.

Features of the above aspects can be combined in any suitable manner. It will be understood that the above description is of specific embodiments by way of aspect only and that many modifications and alterations will be within the skilled person's reach and are intended to be covered by the scope of the appendant claims.

The invention claimed is:

1. A particle accelerator comprising:

a waveguide comprising a series of acceleration cells, wherein the series of acceleration cells includes an input acceleration cell, configured to accelerate a beam of electrons along a central axis of the series of acceleration cells;

a source of electrons configured to input the beam of electrons into the input acceleration cell; and a magnet arrangement configured to prevent one or more electrons that have deviated from the beam of electrons from colliding with the source of electrons and configured to redirect the one or more electrons that have deviated from the beam of electrons by approximately 180 degrees back towards the beam of electrons.

2. The particle accelerator of claim 1, wherein the input acceleration cell has a first end and a second end, and wherein the magnet arrangement is located at the first end of the input acceleration cell.

3. The particle accelerator of claim 2, wherein the magnet arrangement is configured as a ring around the first end of the input acceleration cell.

4. The particle accelerator of claim 1, wherein a nozzle of the source of electrons is configured to output electrons into the input acceleration cell, and wherein the magnet arrangement is located at the nozzle.

5. A method for use in a particle accelerator, the method comprising:

producing a beam of electrons from a source of electrons;

inputting the beam of electrons into an input acceleration cell of a waveguide;

applying an RF field to the waveguide to create an oscillating electric field along a central axis of the waveguide to accelerate the beam of electrons along the central axis;

trapping electrons that have deviated from the beam of electrons using a magnet arrangement, wherein the magnet arrangement is configured to redirect one or more electrons that have deviated from the beam of electrons by approximately 180 degrees back towards the beam of electrons; and turning off the magnet arrangement to allow trapped electrons to join the beam of electrons.

6. The particle accelerator of claim 1, wherein the magnet arrangement is located at an intersection between the source of electrons and the input acceleration cell.

7. The particle accelerator of claim 1, wherein the magnet arrangement includes a first alpha magnet, the first alpha magnet comprising:

an entrance point configured to receive electrons travelling in a first direction; and a magnetic field of increasing strength in a direction away from the entrance point, such that the received electrons travel along a beam path and exit the magnet arrangement at the entrance point travelling in a second direction.

8. The particle accelerator of claim 7, wherein the second direction is angled at 270 degrees to the first direction.

9. The particle accelerator of claim 7, wherein the magnet arrangement further includes a second alpha magnet, wherein the second alpha magnet is positioned to receive electrons from the first alpha magnet, and wherein the first alpha magnet is angled at 90 degrees to the second alpha magnet.

10. The particle accelerator of claim 1, wherein the source of electrons is positioned at a location that does not lie along the central axis of the acceleration cells.

11. The particle accelerator of claim 1, further comprising:

a source of electromagnetic radiation configured to supply electromagnetic radiation to the waveguide to accelerate the beam of electrons.

12. The particle accelerator of claim 1, further comprising:

a target, wherein the target is configured to be struck by the beam of electrons and produce radiation.

13. A radiotherapy device comprising:

a particle accelerator, the particle accelerator including:

a waveguide comprising a series of acceleration cells, wherein the series of acceleration cells comprises an input acceleration cell, configured to accelerate a beam of electrons along a central axis of the series of acceleration cells;

a source of electrons configured to input the beam of electrons into the input acceleration cell; and a magnet arrangement configured to prevent one or more electrons that have deviated from the beam of electrons from colliding with the source of electrons and configured to redirect the one or more electrons that have deviated from the beam of electrons by approximately 180 degrees back towards the beam of electrons.

14. The method of claim 5, wherein turning off the magnet arrangement is timed to coincide with a phase change of the RF field applied to the waveguide.

15. A particle accelerator arranged to receive a beam of electrons, comprising:

a waveguide including a series of acceleration cells, wherein the series of acceleration cells includes an input acceleration cell;

a source of electrons configured to input electrons into the input acceleration cell; and a diversion channel configured to remove electrons from the waveguide that are traveling towards the source of electrons, wherein the diversion channel is further configured to redirect the removed electrons by approximately 180 degrees back toward the input acceleration cell using a magnetic field.

16. The particle accelerator of claim 15, wherein the diversion channel is further configured to remove electrons from the input acceleration cell.

17. The particle accelerator of claim 15, wherein the diversion channel is located an intersection between the source of electrons and the input acceleration cell.

18. The particle accelerator of claim 15, wherein the diversion channel is connected to a secondary particle accelerator that is configured to accelerate a secondary beam of electrons.

19. The particle accelerator of claim 18, wherein the diversion channel, the secondary particle accelerator, and the secondary beam of electrons are used for patient imaging.

* * * * *